(12) United States Patent
Ramaswamy

(10) Patent No.: US 9,723,377 B2
(45) Date of Patent: Aug. 1, 2017

(54) VIDEO MANAGEMENT

(71) Applicant: Comcast Cable Communications, LLC, Philadelphia, PA (US)

(72) Inventor: Srinath V. Ramaswamy, East Windsor, NJ (US)

(73) Assignee: Comcast Cable Communications, LLC, Philadelphia, PA (US)

( * ) Notice: Subject to any disclaimer, the term of this patent is extended or adjusted under 35 U.S.C. 154(b) by 249 days.

(21) Appl. No.: 14/263,459

(22) Filed: Apr. 28, 2014

(65) Prior Publication Data

US 2015/0312650 A1 Oct. 29, 2015

(51) Int. Cl.
| | |
|---|---|
| *H04N 7/173* | (2011.01) |
| *H04N 21/845* | (2011.01) |
| *H04N 5/14* | (2006.01) |
| *H04N 21/2662* | (2011.01) |
| *H04N 21/234* | (2011.01) |
| *H04N 21/81* | (2011.01) |
| *G11B 27/031* | (2006.01) |
| *H04N 19/132* | (2014.01) |
| *H04N 19/142* | (2014.01) |
| *H04N 19/48* | (2014.01) |
| *H04N 19/87* | (2014.01) |

(Continued)

(52) U.S. Cl.
CPC ......... *H04N 21/845* (2013.01); *G11B 27/031* (2013.01); *H04N 5/147* (2013.01); *H04N 19/132* (2014.11); *H04N 19/142* (2014.11); *H04N 19/40* (2014.11); *H04N 19/48* (2014.11); *H04N 19/625* (2014.11); *H04N 19/87* (2014.11); *H04N 21/23418* (2013.01); *H04N 21/2662* (2013.01); *H04N 21/812* (2013.01)

(58) Field of Classification Search
CPC . H04N 21/2622; H04N 21/845; H04N 21/812
USPC .............................................. 725/55, 81, 90
See application file for complete search history.

(56) References Cited

U.S. PATENT DOCUMENTS

| | | | | |
|---|---|---|---|---|
| 8,873,626 B2* | 10/2014 | Karczewicz | ..... | H04N 19/00733 375/240.15 |
| 9,152,867 B2* | 10/2015 | Craft | .................. | G06K 9/00885 |
| 9,384,402 B1* | 7/2016 | Furman | .............. | G06K 9/00805 |

(Continued)

FOREIGN PATENT DOCUMENTS

WO 2006/094033 A1 9/2006

OTHER PUBLICATIONS

European Search Report—EP Appl. 15165411.8—dated Sep. 15, 2015.

(Continued)

*Primary Examiner* — Pankaj Kumar
*Assistant Examiner* — Sahar Baig
(74) *Attorney, Agent, or Firm* — Banner & Witcoff, Ltd.

(57) ABSTRACT

The disclosure relates to a method of processing a sequence of image frames to reduce its length. One implementation may involve extracting coefficients (e.g., Discrete Cosine Transform coefficients) from components of individual frames, and comparing the resulting coefficients for sequential frames to identify frames having the least change from a prior frame. Also, scene change values for each frame may be calculated and placed in a sorted list to facilitate identification of frames for removal. Frame removal may be conducted in rounds, where a group of pictures (GOP) may only have one frame removed for any given round.

23 Claims, 5 Drawing Sheets

(51) Int. Cl.
*H04N 19/40* (2014.01)
*H04N 19/625* (2014.01)

(56) References Cited

U.S. PATENT DOCUMENTS

| | | | | |
|---|---|---|---|---|
| 2002/0147834 A1* | 10/2002 | Liou | ...................... | H04L 29/06 709/236 |
| 2002/0176025 A1* | 11/2002 | Kim | ...................... | H03M 7/30 348/699 |
| 2003/0142750 A1* | 7/2003 | Oguz | ..................... | H04N 5/142 375/240.18 |
| 2004/0022313 A1 | 2/2004 | Kim | | |
| 2006/0282864 A1* | 12/2006 | Gupte | ................ | H04N 7/17318 725/89 |
| 2008/0107328 A1* | 5/2008 | Chen | ..................... | G06T 7/0004 382/149 |
| 2010/0027663 A1 | 2/2010 | Dai et al. | | |
| 2011/0188740 A1* | 8/2011 | Lim | ......................... | G06K 9/00 382/154 |
| 2015/0139610 A1* | 5/2015 | Syed | ..................... | G11B 27/34 386/241 |
| 2015/0373328 A1* | 12/2015 | Yenneti | .................. | H04N 19/61 375/240.03 |

OTHER PUBLICATIONS

Boon-Lock et al.—"Rapid Scene Analysis on Compressed Video"—8378 IEEE Transactions on Circuits and Systems for Video Technology—IEEE Service Center—vol. 5, No. 6—published Dec. 1, 1995.

Sadlier et al.—"Automatic TV advertisement detection from MPEG bitstream"—Pattern Recognition, Elsevier, GB—vol. 35, No. 12—dated Dec. 1, 2002.

Kang-Wook et al.—Key frame number assignment measuring content variations—ICT Convergence (ICTC), 2012 International Conference on, IEEE—dated Oct. 15, 2012.

\* cited by examiner

VIDEO MANAGEMENT

BACKGROUND

Advances in data transmission technologies have allowed content providers to transmit multiple streams of content to users, and hundreds of channels of television programming can be delivered. In some cases, a user's viewing experience may automatically hop from one channel to another. For example, when a television program enters a commercial break, the ensuing commercials might actually be carried on a different channel or datastream, and the viewer's device (unbeknownst to the viewer) may quickly switch tuning to the different channel for the duration of the commercial, and back to the television program (or to another channel carrying another commercial) when the commercial ends. To help tuners quickly lock on to the audiovisual signals during such rapid tuning, video transmission standards call for advertisements to begin with a few moments of blank/black video and silent audio. Unfortunately, many advertisers provide commercials that lack these moments of blank/black video and silent audio. Adding such moments to the beginning and end of the commercial may result in extending the commercial's duration, which may make it difficult for the commercial to fit within its allotted time in a commercial break. There remains a need to gracefully make these commercials comply with the video transmission standards while also allowing them to fit within their allotted time in a commercial break.

SUMMARY

The following summary is for illustrative purposes only, and is not intended to limit or constrain the detailed description.

Features herein relate to managing a video content comprising a sequence of image frames by dropping frames in the content. The number of frames to be dropped can depend on the amount of time that is desired to be trimmed from the content. The selection of frames to be dropped can begin with generating a frame value (e.g., a zero frequency value) for each frame in the video. The frame value can be the DC coefficient component (e.g., a zero frequency, or top-left element in a transform coefficient array) from, for example, each 8×8 pixel block extracted from the frame after a process such as a Discrete Cosine Transform. In some embodiments, the coefficients selected may be from the luminance (e.g., luma) component of the image frame, although chrominance components may be used if desired.

When the frame values are generated for the frames in the video content, scene change values may then be generated for each frame in the video by comparing frame values of neighboring sequential frames. The scene change value for a frame may represent, for example, how much changed (e.g., visually) between the frame and its previous frame in the video content. For example, the scene change values may be determined as follows:

$$C(v) = \sum_{n=1}^{n=h} \sum_{m=1}^{m=w} abs[DCv(m,n) - DCu(m,n)]$$

wherein $C(v)$=the scene change value for the v th frame in the video content, $DCv(m,n)$=the Discrete Cosine Transform DC component of the m,n 8×8 block of DCT coefficients in the v th frame of the video content, $DCu(m,n)$=the Discrete Cosine Transform DC component of the m,n 8×8 block of DCT coefficients in the u th frame of the video content, $v=u+1$, w=the width of the frame, which may be measured in 8×8 pixel blocks, and h=the height of the frame, which may be measured in 8×8 pixel blocks.

In some embodiments, the frame removal may be conducted in rounds, where each group of pictures (GOP) in the video may be limited to having just one (or other predetermined limit) frame removed per round. The selection of frames for removal may generally seek to remove frames that have the least amount of change from a prior frame.

In some embodiments, the video may initially include dependent frames, and dependent macroblock portions of frames. The present system may initially process these frames to recover their frame values in independent form, prior to calculating the scene change values and selecting frames for removal.

The summary here is not an exhaustive listing of the novel features described herein, and are not limiting of the claims. These and other features are described in greater detail below.

BRIEF DESCRIPTION OF THE DRAWINGS

These and other features, aspects, and advantages of the present disclosure will become better understood with regard to the following description, claims, and drawings. The present disclosure is illustrated by way of example, and not limited by, the accompanying figures in which like numerals indicate similar elements.

DETAILED DESCRIPTION

In the following description of various illustrative embodiments, reference is made to the accompanying drawings, which form a part hereof, and in which is shown, by way of illustration, various embodiments in which aspects of the disclosure may be practiced. It is to be understood that other embodiments may be utilized, and structural and functional modifications may be made, without departing from the scope of the present disclosure.

Figure 1:
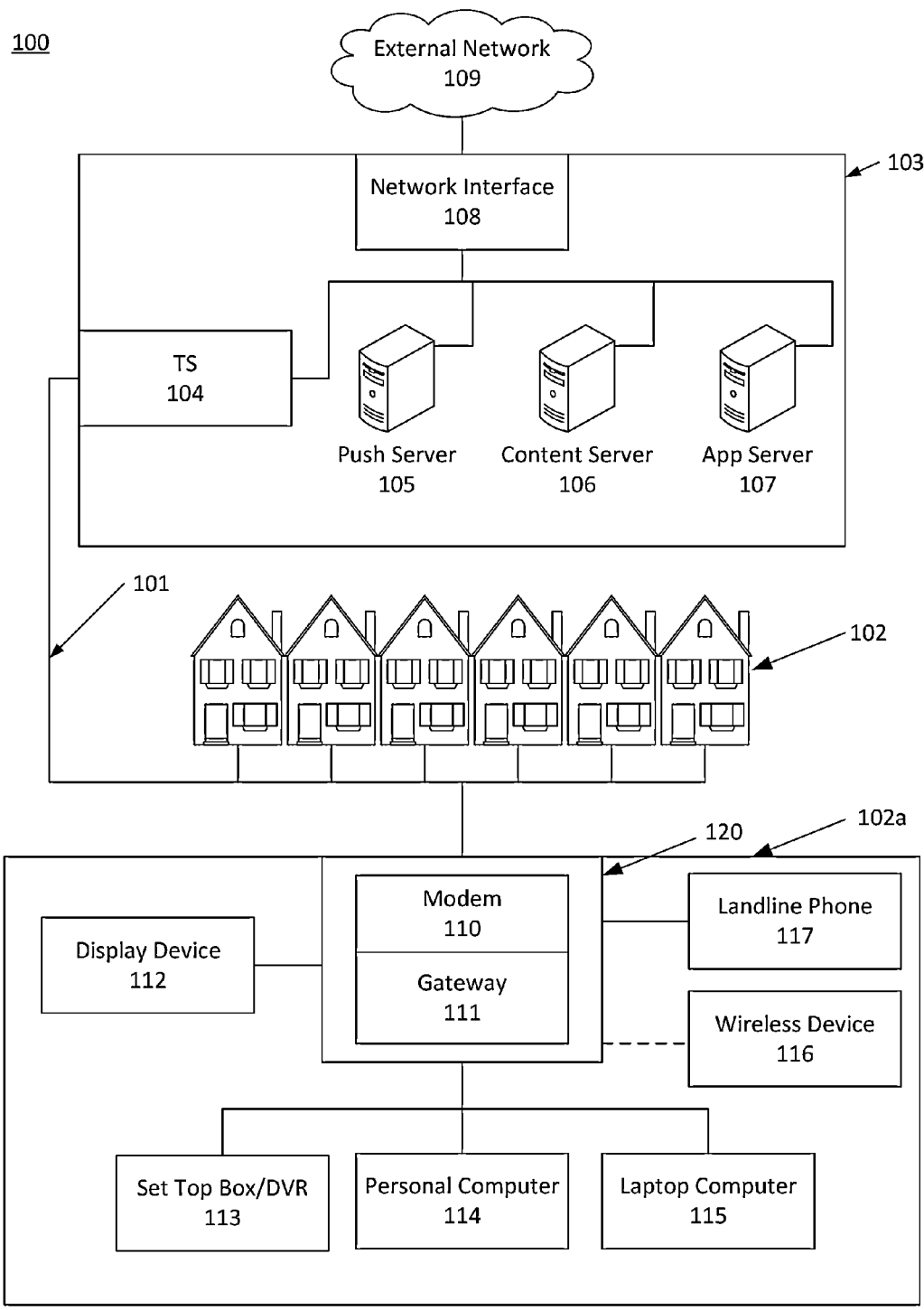
FIG. 1 illustrates an example communication network on which various features described herein may be used.

FIG. 1 illustrates an example communication network 100 on which many of the various features described herein may be implemented. Network 100 may be any type of information distribution network, such as satellite, telephone, cellular, wireless, etc. One example may be an optical fiber network, a coaxial cable network, or a hybrid fiber/coax distribution network. Such networks 100 use a series of interconnected communication links 101 (e.g., coaxial cables, optical fibers, wireless, etc.) to connect multiple premises 102 (e.g., businesses, homes, consumer dwellings, etc.) to a local office or headend 103. The local office 103 may transmit downstream information signals onto the links 101, and each premises 102 may have a receiver used to receive and process those signals.

There may be one link 101 originating from the local office 103, and it may be split a number of times to distribute the signal to various premises 102 in the vicinity (which may be many miles) of the local office 103. The links 101 may include components not illustrated, such as splitters, filters, amplifiers, etc. to help convey the signal clearly, but in general each split introduces a bit of signal degradation. Portions of the links 101 may also be implemented with fiber-optic cable, while other portions may be implemented with coaxial cable, other lines, or wireless communication paths. By running fiber optic cable along some portions, for example, signal degradation may be significantly minimized, allowing a single local office 103 to reach even farther with its network of links 101 than before.

The local office 103 may include an interface, such as a termination system (TS) 104. More specifically, the interface 104 may be a cable modem termination system (CMTS), which may be a computing device configured to manage communications between devices on the network of links 101 and backend devices such as servers 105-107 (to be discussed further below). The interface 104 may be as specified in a standard, such as the Data Over Cable Service Interface Specification (DOCSIS) standard, published by Cable Television Laboratories, Inc. (a.k.a. CableLabs), or it may be a similar or modified device instead. The interface 104 may be configured to place data on one or more downstream frequencies to be received by modems at the various premises 102, and to receive upstream communications from those modems on one or more upstream frequencies.

The local office 103 may also include one or more network interfaces 108, which can permit the local office 103 to communicate with various other external networks 109. These networks 109 may include, for example, networks of Internet devices, telephone networks, cellular telephone networks, fiber optic networks, local wireless networks (e.g., WiMAX), satellite networks, and any other desired network, and the network interface 108 may include the corresponding circuitry needed to communicate on the external networks 109, and to other devices on the network such as a cellular telephone network and its corresponding cell phones.

As noted above, the local office 103 may include a variety of servers 105-107 that may be configured to perform various functions. For example, the local office 103 may include a push notification server 105. The push notification server 105 may generate push notifications to deliver data and/or commands to the various premises 102 in the network (or more specifically, to the devices in the premises 102 that are configured to detect such notifications). The local office 103 may also include a content server 106. The content server 106 may be one or more computing devices that are configured to provide content to users at their premises. This content may be, for example, video on demand movies, television programs, songs, text listings, etc. The content server 106 may include software to validate user identities and entitlements, to locate and retrieve requested content, to encrypt the content, and to initiate delivery (e.g., streaming) of the content to the requesting user(s) and/or device(s).

The local office 103 may also include one or more application servers 107. An application server 107 may be a computing device configured to offer any desired service, and may run various languages and operating systems (e.g., servlets and JSP pages running on Tomcat/MySQL, OSX, BSD, Ubuntu, Redhat, HTML5, JavaScript, AJAX and COMET). For example, an application server may be responsible for collecting television program listings information and generating a data download for electronic program guide listings. Another application server may be responsible for monitoring user viewing habits and collecting that information for use in selecting advertisements. Yet another application server may be responsible for formatting and inserting advertisements in a video stream being transmitted to the premises 102. Although shown separately, one of ordinary skill in the art will appreciate that the push server 105, content server 106, and application server 107 may be combined. Further, here the push server 105, content server 106, and application server 107 are shown generally, and it will be understood that they may each contain memory storing computer executable instructions to cause a processor to perform steps described herein and/or memory for storing data.

An example premises 102a, such as a home, may include an interface 120. The interface 120 can include any communication circuitry needed to allow a device to communicate on one or more links 101 with other devices in the network. For example, the interface 120 may include a modem 110, which may include transmitters and receivers used to communicate on the links 101 and with the local office 103. The modem 110 may be, for example, a coaxial cable modem (for coaxial cable lines 101), a fiber interface node (for fiber optic lines 101), twisted-pair telephone modem, cellular telephone transceiver, satellite transceiver, local wi-fi router or access point, or any other desired modem device. Also, although only one modem is shown in FIG. 1, a plurality of modems operating in parallel may be implemented within the interface 120. Further, the interface 120 may include a gateway interface device 111. The modem 110 may be connected to, or be a part of, the gateway interface device 111. The gateway interface device 111 may be a computing device that communicates with the modem(s) 110 to allow one or more other devices in the premises 102a, to communicate with the local office 103 and other devices beyond the local office 103. The gateway 111 may be a set-top box (STB), digital video recorder (DVR), computer server, or any other desired computing device. The gateway 111 may also include (not shown) local network interfaces to provide communication signals to requesting entities/devices in the premises 102a, such as display devices 112 (e.g., televisions), additional STBs or DVRs 113, personal computers 114, laptop computers 115, wireless devices 116 (e.g., wireless routers, wireless laptops, notebooks, tablets and netbooks, cordless phones (e.g., Digital Enhanced Cordless Telephone—DECT phones), mobile phones, mobile televisions, personal digital assistants (PDA), etc.), landline phones 117 (e.g. Voice over Internet Protocol—VoIP phones), and any other desired devices. Examples of the local network interfaces include Multimedia Over Coax Alliance (MoCA) interfaces, Ethernet interfaces, universal serial bus (USB) interfaces, wireless interfaces (e.g., IEEE 802.11, IEEE 802.15), analog twisted pair interfaces, Bluetooth interfaces, and others.

Figure 2:
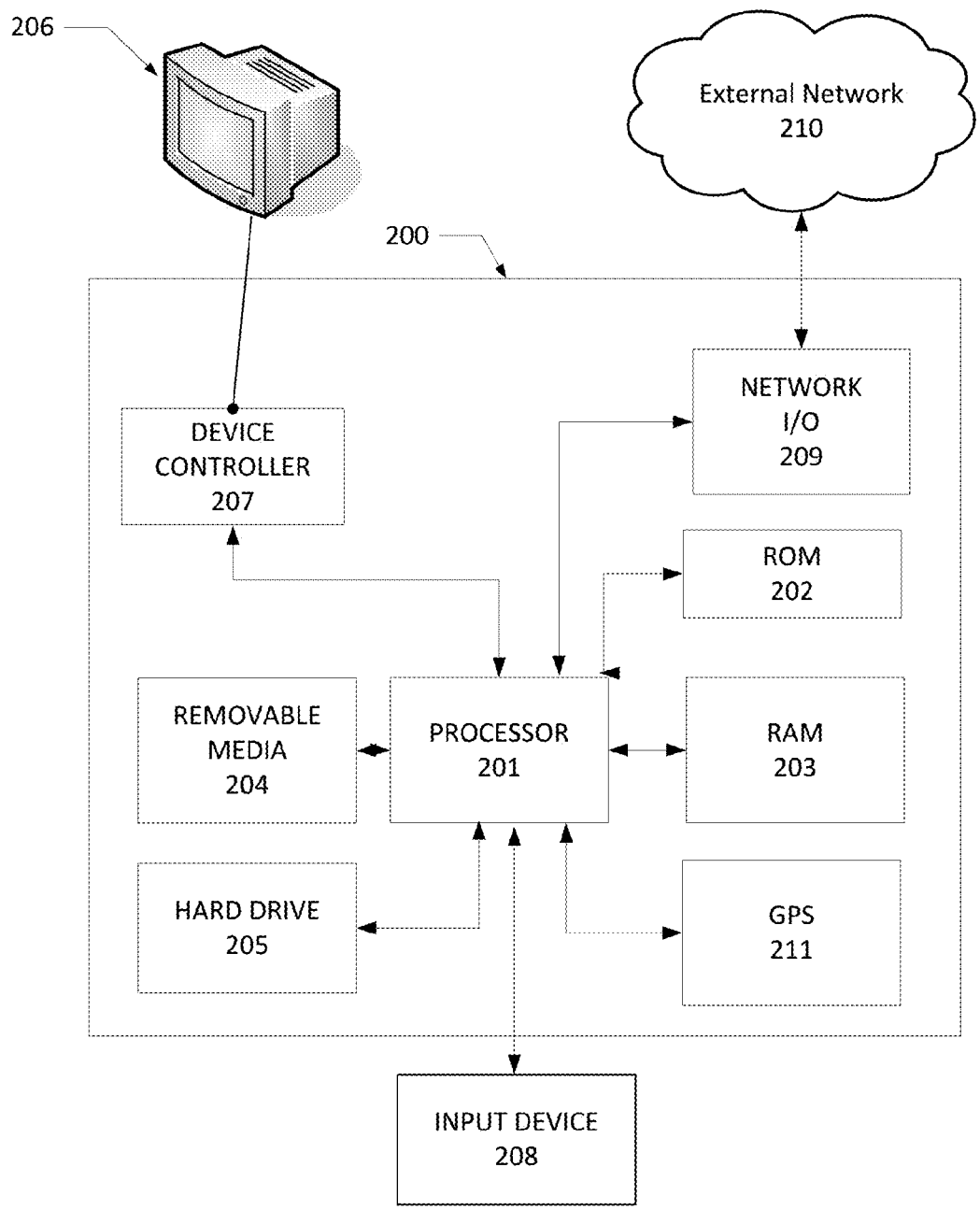
FIG. 2 illustrates an example computing device that can be used to implement any of the methods, servers, entities, and computing devices described herein.

FIG. 2 illustrates general hardware elements that can be used to implement any of the various computing devices discussed herein. The computing device 200 may include one or more processors 201, which may execute instructions of a computer program to perform any of the features described herein. The instructions may be stored in any type of computer-readable medium or memory, to configure the operation of the processor 201. For example, instructions may be stored in a read-only memory (ROM) 202, random access memory (RAM) 203, removable media 204, such as a Universal Serial Bus (USB) drive, compact disk (CD) or digital versatile disk (DVD), floppy disk drive, or any other desired storage medium. Instructions may also be stored in an attached (or internal) hard drive 205. The computing device 200 may include one or more output devices, such as a display 206 (e.g., an external television), and may include one or more output device controllers 207, such as a video processor. There may also be one or more user input devices 208, such as a remote control, keyboard, mouse, touch screen, microphone, etc. The computing device 200 may also include one or more network interfaces, such as a network input/output (I/O) circuit 209 (e.g., a network card) to communicate with an external network 210. The network input/output circuit 209 may be a wired interface, wireless interface, or a combination of the two. In some embodiments, the network input/output circuit 209 may include a modem (e.g., a cable modem), and the external network 210 may include the communication links 101 discussed above, the external network 109, an in-home network, a provider's wireless, coaxial, fiber, or hybrid fiber/coaxial distribution system (e.g., a DOCSIS network), or any other desired network. Additionally, the device may include a location-detecting device, such as a global positioning system (GPS) microprocessor 211, which can be configured to receive and process global positioning signals and determine, with possible assistance from an external server and antenna, a geographic position of the device.

The FIG. 2 example is a hardware configuration, although the illustrated components may be implemented as software as well. Modifications may be made to add, remove, combine, divide, etc. components of the computing device 200 as desired. Additionally, the components illustrated may be implemented using basic computing devices and components, and the same components (e.g., processor 201, ROM storage 202, display 206, etc.) may be used to implement any of the other computing devices and components described herein. For example, the various components herein may be implemented using computing devices having components such as a processor executing computer-executable instructions stored on a computer-readable medium, as illustrated in FIG. 2. Some or all of the entities described herein may be software based, and may co-exist in a common physical platform (e.g., a requesting entity can be a separate software process and program from a dependent entity, both of which may be executed as software on a common computing device).

One or more aspects of the disclosure may be embodied in a computer-usable data and/or computer-executable instructions, such as in one or more program modules, executed by one or more computers or other devices. Generally, program modules include routines, programs, objects, components, data structures, etc. that perform particular tasks or implement particular abstract data types when executed by a processor in a computer or other data processing device. The computer executable instructions may be stored on one or more computer readable media such as a hard disk, optical disk, removable storage media, solid state memory, RAM, etc. As will be appreciated by one of skill in the art, the functionality of the program modules may be combined or distributed as desired in various embodiments. In addition, the functionality may be embodied in whole or in part in firmware or hardware equivalents such as integrated circuits, field programmable gate arrays (FPGA), and the like. Particular data structures may be used to more effectively implement one or more aspects of the disclosure, and such data structures are contemplated within the scope of computer executable instructions and computer-usable data described herein.

Figure 3A:
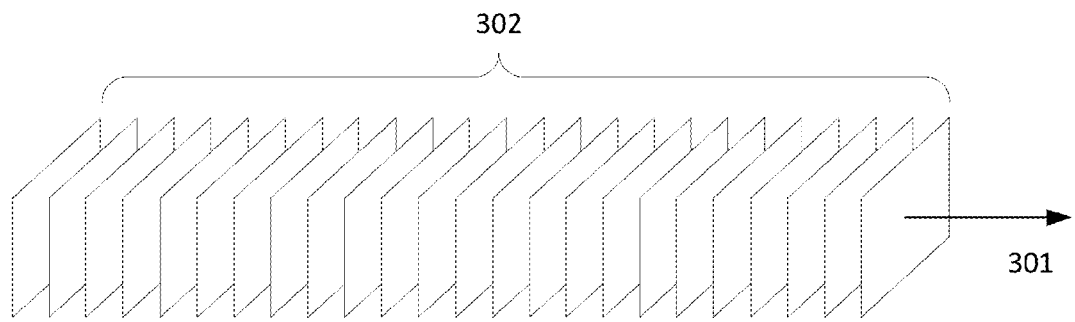
FIGS. 3A-C illustrate an example concept diagram showing the removal of selected frames from a video stream.
Figure 3B:
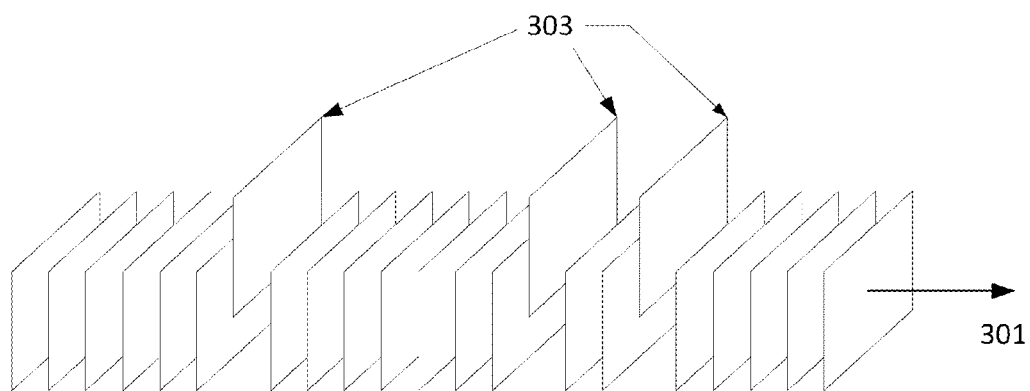
Figure 3C:
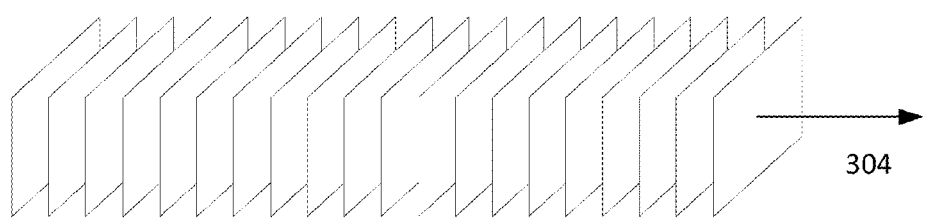

FIGS. 3A-C are conceptual visualizations of video streams containing sequences of image frames. In FIG. 3A, a video stream 301 is comprised of a plurality of image frames 302 that are sequentially displayed at a predetermined display rate (e.g., 30 frames per second). The encoding and delivery of the stream 301 may be done in a variety of ways. One example uses MPEG-2 (Moving Pictures Expert Group) encoding, which uses motion vector-based compression to efficiently represent the stream of image frames 302. Using this compression, each frame is categorized as either an independent frame or a dependent frame. Independent frames are represented in the stream by data that is sufficient to generate the frame's complete image without knowledge about neighboring frames in the stream, similar to how a still image picture may be represented. The first frame after a scene change is typically represented using an independent frame.

Dependent frames, as their name implies, are represented by data that is dependent on another frame in the stream, such as a corresponding independent frame, to generate the complete image of the dependent frame. The data representing a dependent frame may simply indicate changes with respect to a prior frame. For example, the data for a dependent frame may simply indicate that a first portion of the image remains unchanged from the prior frame, and that a second portion moves some distance (e.g., 3 pixels) to the right. In this manner, the data representing the dependent frame can omit the full details for the first portion of the dependent frame's image, thereby reducing the amount of data that is needed to be transmitted.

In the MPEG-2 standard, which is one example audiovisual standard usable herein, independent frames are referred to as Intra-coded picture frames (I-frames), while dependent frames are referred to as either Predicted picture frames (P-frames), or a Bi-directional predicted picture frames (B-frames). A P-frame is dependent on a prior frame in the stream, while a B-frame is dependent on both a prior and a subsequent frame in the stream.

In some embodiments, this motion vector-based compression can be done on an even smaller scale than a frame. For example, a single image frame may be divided into smaller sub-frames, and the same VP/B-frame treatment may be performed at the sub-frame level. For example, the sub-frame can be an 8×8 collection of pixels, a 16×16 collection of pixels, or any other desired portion of the frames. In MPEG-2, so-called "macroblocks" may be formed by performing discrete cosine transforms on block portions of the frame. There, a 16×16 macroblock may be comprised of 16×16 luma (Y) samples and 8×8 chroma (Cb and Cr) samples.

As noted above, a user's video device (e.g., gateway, smartphone, Digital Video Recorder, Set-Top Box, etc.) may need to tune to different channels (e.g., different Quadrature Amplitude Modulated (QAM) channels on different frequencies, different logical streams carried on a single QAM channel, different Internet Protocol streams, etc.) when presenting the user with video commercials during a break in scheduled programming (e.g., a television program, movie, etc.), and may need to return to an original channel or stream when the commercial break ends and the scheduled programming resumes. To allow smoother and quick transitions, the commercial break content may be shortened to allow moments of silent audio and blank and/or black video at the beginning and end of the commercials. So, for example, if the commercial stream 301 is 30-seconds in duration, but the content provider wishes to have 0.5 seconds of silence/black on either end of the commercial, then the 30-second commercial needs to be reduced to 29 seconds in duration. To support this using the features described herein, certain frames 303 (FIG. 3B) in the stream may be selected for removal based on how disruptive their removal would be. The resulting shortened stream 304 (FIG. 3C) may then be transmitted for tuning and presentation to the user at the appropriate time.

Figure 4A:
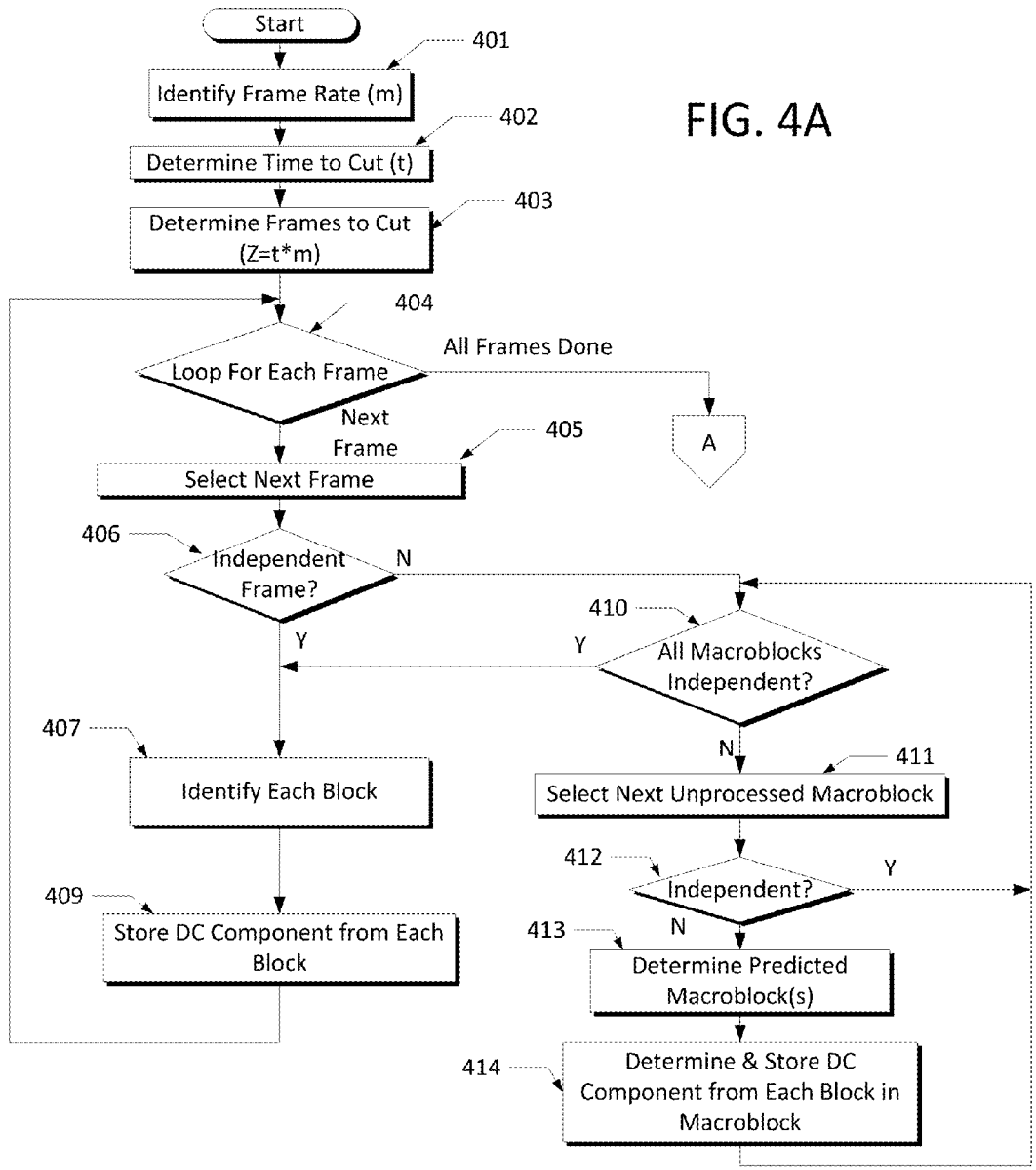
FIGS. 4A-B illustrate an example algorithm for removing frames from a video stream.

FIGS. 4A and B illustrate an example process by which frames, such as the selected frames 303, may be chosen for removal to create the shortened stream 304. The process may be performed by any one or more computing devices capable of video delivery, and in the FIG. 1 example network, the process may be performed at least in part by the content server 106 computing device.

Beginning in step 401, the computing device may receive a video stream 301 (or a file) and determine the frame rate (m) of the original video stream 301. This may be, for example, identified by information in the video stream 301 file. In step 402, the computing device may determine the amount of time (t) that is to be removed from the video stream 301. For example, a 30-second segment, such as a commercial, may need to be reduced by one second, to result in a 29-second commercial.

In step 403, the computing device may determine the number of frames (Z) that will need to be removed from the video stream 301 to achieve the desired reduction in time (t). This calculation may be as follows: (Z=t*m).

In step 404, the computing device may begin to process each frame (e.g., in a looping fashion) in the stream 301 and generate corresponding comparison data that will be used in the eventual frame selection. In general, the frame selection algorithm may seek to identify the frames whose removal would cause the least amount of disruption to the resulting video stream, so that the shortened stream 304 will provide as close an experience as possible to the original stream 301. This selection algorithm may need to compare data, the comparison data, representing visual elements of each of the various frames in the stream 301 to make this selection.

In one example embodiment, the selection of frames may be based on comparisons of values representing portions of the video frame, such as the DC coefficient values for subsampled blocks of the frame. In one example embodiment, luminance (Y) components of blocks (e.g., 8×8 luma blocks) in an image may be processed through a Discrete Cosine Transform (DCT), resulting in an array of values, such as luminance DC coefficient values, for subsampled blocks of the frame, and these values may be compared in the eventual selection of frames. The values may be stored in the video file according to some video formats, although in other video formats the values may be obtained by performing the DCT on other data representing the frame. The details of this processing are discussed further below with regard to step 407.

The loop beginning in step 404 may sequentially step through each frame in the stream 301. In step 405, the computing device may select the next frame for processing. This selection may include maintaining a record of the sequence of frames in the video stream 301, identifying the ones that have been processed to generate the comparison data for that frame, and selecting the earliest frame in the sequence that has not yet been processed to generate its comparison data.

In step 406, the computing device may determine whether the selected frame is an independent frame, or I-frame. If the selected frame is an independent frame, then in step 407, the computing device may proceed to generate the comparison data for that frame by first identifying portions, such as each 8×8 luma block of DCT coefficients, in the frame.

The comparison data, as will be discussed below, may be used to compare successive frames to identify an amount of change between the two frames. In some embodiments, the comparison data may be the DC coefficients that result when luminance components of a macroblock (e.g., a luma block) are processed using a Discrete Cosine Transform (DCT). Although the luminance component is used herein as an example, other features of an image frame may be used as well. For example, a chrominance component may be used instead.

In step 408, the computing device may perform a process such as a Discrete Cosine Transform (DCT) on the portion of the frame (e.g., an 8×8 pixel luma block). This step may be omitted, however, if the source video is in a compressed format that already includes DCT-transformed luma block information. In step 409, the computing device may then store the DC coefficient of the result of the DCT for each portion (e.g., the luma DCT block). As a result, the computing device may store an array identifying the frame content, such as the luminance component DCT DC coefficients for all luma blocks in the frame. If the original frame is 720×480 pixels, and the luma blocks represent 8×8 pixel blocks, then this may result in a 90×60 array of luminance component DCT DC coefficients for the frame. Although DCT processes are used as an example above, other processes may be used to represent the content of a particular portion (or the entirety) of a frame for comparison purposes.

In step 406, if the selected frame is a dependent frame, then the luminance values for the various macroblocks in the frame may depend on neighboring frame(s), and may first need to be decoded before they can be processed to obtain the coefficients discussed above. Step 410 may begin a looping process to ensure that the luminance component coefficient values for all of the luma blocks in the current frame are decoded and available for use in the step 409 storing of the component (e.g., the DC component) from each luma block. The looping process may sequentially process each macroblock in the frame, and in step 411, the computing device may select the next macroblock for processing.

In step 412, the computing device may determine whether the selected macroblock is an independent macroblock. As described above, frames may be independent or dependent, based on whether the frame's data can be derived without reference to a neighboring frame's data. The same approach may be used at the macroblock level. An independent macroblock may be represented by data that can be used to generate the macroblock's portion of the frame, while a dependent macroblock may be represented by data that refers to one or more macroblocks in reference pictures.

If the macroblock is dependent on another macroblock, then in step 413, the computing device may determine what other macroblock(s), or their predicted macroblock(s), are needed to decode the current macroblock. In step 414, the computing device may retrieve the data for those other predicted macroblocks, and may use that data to decode the DC component information for each 8×8 luma block in the current macroblock. The process may then return to step 410, and repeat until the computing device stores an array of data, such as the luminance component DCT DC coefficients, for the frame. At this point, the computing device now stores sufficient information for the dependent frame to generate its display without further reference to neighboring frame(s). From there, the process may proceed to step 407, to generate the comparison data, e.g., the luminance DC component, for each of the macroblocks in the frame, and the two loops above may continue processing until the computing device has generated comparison data values, such as luminance component DCT DC coefficient values, for each frame in the video.

Figure 4B:
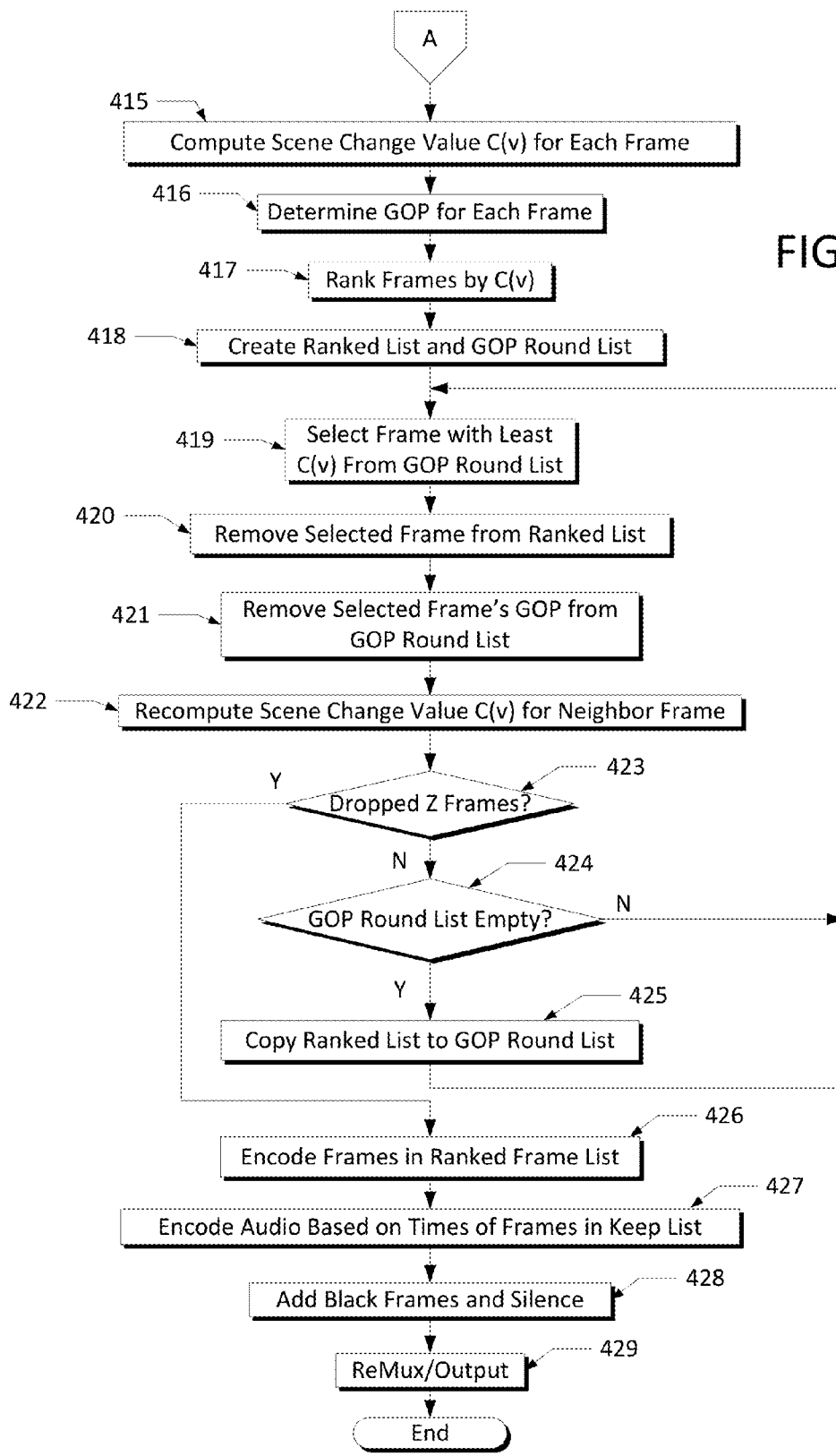

Returning to step 404, when all frames have been processed to generate the comparison data, the computing device may proceed to step 415, and begin a process of comparing frames to select frames for removal. FIG. 4b illustrates this portion of the process. In step 415, the scene change value C(v) for each frame may be calculated as a sum of the differences in the comparison values (e.g., the luminance DC component values) between corresponding sampling points in the frame and the immediately preceding frame. The determination for C(v) of a vth image frame in a sequence of image frames may be expressed as follows:

$$C(v) = \sum_{n=1}^{n=h} \sum_{m=1}^{m=w} \text{abs}[DCv(m, n) - DCu(m, n)]$$

wherein

C(v)=the scene change value for the vth frame in the video content,

DCv(m,n)=the Discrete Cosine Transform DC component of the m,n 8×8 block of DCT coefficients in the vth frame of the video content, DCu(m,n)=the Discrete Cosine Transform DC component of the m,n 8×8 block of DCT coefficients in the uth frame of the video content, v=u+1, w=the width of the frame, measured in 8×8 pixel blocks (8×8 pixel blocks are an example, and in alternate embodiments any desired sample size may be used), and h=the height of the frame, measured in 8×8 pixel blocks.

In this example, the video content may be a sequence of image frames. As individual image frames are removed, the same calculations may be made for the image frames in the remaining sequence of image frames.

The first frame may have its scene change value compared against zero values, resulting in a relatively high value of change.

From step 415, the computing device may determine and optionally store in memory a scene change value C(v) for each frame in the video, and may proceed to step 416, in which the various frames may be grouped into groups of pictures (GOP). In video coding, a GOP may be a collection of frames that have a common independent frame. For example, one GOP may comprise an independent frame and all of its corresponding dependent frames.

In step 417, the computing device may create a ranked frame list that ranks the various frames according to their scene change values C(v), from lowest to highest.

In step 418, the computing device may then create a GOP round list that, at first, is simply a copy of the ranked frame list. The ranked frame list and GOP round list may be used in the ensuing steps to remove the frames that have the lowest scene change value, but to also evenly (to the extent possible) distribute the removal of frames across the various GOPs, so that no single GOP becomes disproportionately affected by having too many of its frames removed.

In step 419, the computing device may examine the GOP round list, and identify the first one on the list (i.e., the frame with the lowest scene change value C(v)) for removal. In step 420, the selected frame may then be removed from the ranked frame list.

In step 421, the computing device may determine the GOP to which the selected frame belonged, and may remove all of the GOP's other frames from the GOP round list.

The removal of the selected frame now means that the scene change value C(v) calculated for the frame that followed the selected frame in the source video, the next frame, is outdated (since that scene change value calculated a difference using the now-removed frame's DC coefficient values). So in step 422, the computing device may recompute the scene change value C(v) for that next frame, but instead of comparing the next frame's coefficient values with those of the selected frame, the computing device may compare the values of the next frame with the frame that preceded the selected frame in the source video. In some embodiments, this recomputing may be optional, since the small change in scene often means that the recomputed value will be nearly the same as before. The recomputing may be skipped if the scene change value is smaller than a predetermined minimum change value, and this optional skipping may help reduce processing demand.

In step 423, the computing device may determine whether it has removed the desired number of frames (Z) from the source video. If it has not yet removed enough frames, then in step 424, the computing device may determine whether the GOP round list is empty. If the GOP round list is not empty, then the process may return to step 419 to select the next frame for removal. If the GOP round list was empty in step 424, then the computing device may proceed to step 425, and copy the current ranked frame list (which omits the frames that have been removed so far in the process) to create a new GOP round list, and the process may then return to step 419 to select the next frame for removal.

When the necessary number of frames (Z) has been removed, then the computing device may proceed to step 426, and encode a new video file containing just the frames remaining in the ranked frame list, and may generate new time stamps for the resulting image frames. In step 427, the computing device may encode a new audio soundtrack, based on the audio for the original video, to accompany the reduced set of frames in the video. The encoding of the new audio soundtrack may simply involve skipping portions of audio that accompanied the removed frames.

In step 428, the computing device may add black frames and silent audio portions to the beginning and end of the new video file. This may involve, for example, adding a number (Z) of frames equal to the number of removed frames, and the addition may be evenly split between the beginning and end of the new video file.

In step 429, the computing device may then take the new video file, and transmit it to receiving user devices instead of the original video file. This may entail, for example, remultiplexing the new video file in other streams or channels according to the same schedule used for the original video file.

Although example embodiments are described above, the various features and steps may be combined, divided, omitted, rearranged, revised and/or augmented in any desired manner, depending on the specific outcome and/or application. Various alterations, modifications, and improvements will readily occur to those skilled in art. For example, the example process above uses luminance components, while other embodiments may use chrominance components instead. The example above also limits the frame removal to one frame per GOP per round. That limit can be revised to allow more than one frame from a GOP to be removed per round.

Additional alterations, modifications, and improvements as are made obvious by this disclosure are intended to be part of this description though not expressly stated herein, and are intended to be within the spirit and scope of the disclosure. Accordingly, the foregoing description is by way of example only, and not limiting. This patent is limited only as defined in the following claims and equivalents thereto.

I claim:

1. A method comprising:
ranking, according to scene change values, a plurality of image frames in a sequence of image frames;
shortening the sequence of image frames by removing, from an interior portion of the sequence of image frames and based on the ranking, one or more of the image frames;
in association with the shortening, appending one or more blank frames to a beginning or an end of the shortened sequence of image frames; and
transmitting an updated sequence of image frames, wherein the updated sequence of image frames is the sequence of image frames having the appended one or more blank frames.

2. The method of claim 1, further comprising:
generating the scene change values according to the following formula:

$$C(v) = \sum_{n=1}^{n=h} \sum_{m=1}^{m=w} \text{abs}[DCv(m,n) - DCu(m,n)]$$

wherein
C(v)=a scene change value for a vth image frame,
DCv(m,n)=a Discrete Cosine Transform DC component of an m,n 8×8 block of DCT coefficients in the vth image frame,
DCu(m,n)=a Discrete Cosine Transform DC component of an m,n 8×8 block of DCT coefficients in a uth image frame,
v=u+1,
w=a width of an image frame, and
h=a height of an image frame.

3. The method of claim 1, further comprising:
obtaining luminance component coefficient values for the plurality of image frames in the sequence of image frames; and
generating a respective scene change value for each of the plurality of image frames by comparing the luminance component coefficient values for sequential ones of the plurality of image frames.

4. The method of claim 3, wherein the obtaining the luminance component coefficient values comprises extracting a first pixel block coefficient from a discrete cosine transformed block.

5. The method of claim 1, wherein the shortening further comprises:
selecting the one or more of the image frames for removal based on the ranking;
identifying groups of pictures (GOPs) in the sequence of image frames; and
conducting the selecting in rounds, and limiting selections from each GOP to one frame per round.

6. The method of claim 1, wherein the shortening further comprises selecting an image frame having a least amount of scene change compared to a preceding image frame.

7. The method of claim 3, wherein the obtaining the luminance component coefficient values comprises obtaining the luminance component coefficient values based on one or more chrominance components of the image frames.

8. The method of claim 1, further comprising determining whether a source file of the sequence of image frames contains dependent frames, and in response to determining that the source file contains dependent frames, decoding the dependent frames prior to generating the scene change values.

9. The method of claim 1, further comprising determining that a source file of the sequence of image frames does not contain any dependent frames.

10. A method comprising:
shortening a sequence of image frames by removing image frames from an interior portion of the sequence of image frames based on comparisons between Discrete Cosine Transform (DCT) DC coefficients of sequential image frames in the sequence of image frames;
in association with the shortening, appending blank frames to a beginning or an end of the shortened sequence of image frames; and
transmitting an updated sequence of image frames, wherein the updated sequence of image frames is the sequence of image frames having the appended blank frames.

11. The method of claim 10, further comprising:
identifying groups of pictures (GOP) among the image frames in the sequence of image frames; and
wherein the shortening comprises:
selecting, in rounds, the image frames of the sequence of image frames for removal, wherein the removing is limited to one frame per GOP per round.

12. The method of claim 10, wherein the Discrete Cosine Transform (DCT) DC coefficients are extracted from luminance component DCT values of the image frames.

13. The method of claim 10, wherein the Discrete Cosine Transform (DCT) DC coefficients are extracted from chrominance component DCT values of the image frames.

14. The method of claim 11, further comprising decoding dependent image frames in the sequence of image frames prior to the selecting image frames of the sequence of image frames for removal.

15. The method of claim 10, further comprising:
performing the comparisons by generating a total of differences in DC coefficient from each 8×8 DCT coefficients block between corresponding sample portions of sequential image frames.

16. The method of claim 15, wherein the sample portions are blocks of pixels.

17. The method of claim 15, further comprising calculating a total of differences in DC coefficients from each 8×8 DCT coefficients block between a second image frame and a first image frame in the sequence of image frames, and assigning the total of differences for both the first and second image frames in the sequence of image frames, and using the total of differences in the shortening the sequence of image frames.

18. The method of claim 10, further comprising generating scene change values for each of the image frames in the sequence of image frames according to the following formula:

$$C(v) = \sum_{n=1}^{n=h} \sum_{m=1}^{m=w} \text{abs}[DCv(m,n) - DCu(m,n)]$$

wherein

C(v)=a scene change value for a vth image frame,

DCv(m,n)=a Discrete Cosine Transform DC component of an m,n 8×8 block of DCT coefficients in the vth image frame, DCu(m,n)=a Discrete Cosine Transform DC component of an m,n 8×8 block of DCT coefficients in a uth image frame, v=u+1, w=a width of an image frame, and h=a height of an image frame.

19. A method comprising:
determining a scene change value for each of a plurality of image frames in a sequence of image frames according to the following formula:

$$C(v) = \sum_{n=1}^{n=h} \sum_{m=1}^{m=w} \text{abs}[DCv(m,n) - DCu(m,n)]$$

wherein

C(v)=a scene change value for a vth image frame,

DCv(m,n)=a Discrete Cosine Transform DC component of an m,n 8×8 block of DCT coefficients in the vth image frame, DCu(m,n)=a Discrete Cosine Transform DC component of an m,n 8×8 block of DCT coefficients in a uth image frame, v=u+1, w=a width of an image frame, and h=a height of an image frame; and using the scene change values for the plurality of image frames to select image frames for removal from the sequence of image frames.

20. The method of claim 19, further comprising extracting a pixel block's luminance DC component, and using the extracted luminance DC component to determine the DCv(m,n) value.

21. The method of claim 1, wherein the appending comprises appending the one or more blank frames based on an amount of time associated with the removed one or more of the image frames.

22. The method of claim 1, further comprising determining a number of the removed one or more of the image frames, wherein the appending comprises appending the one or more blank frames based on the number of the removed one or more of the image frames.

23. The method of claim 1, wherein the sequence of image frames comprises commercial content.

* * * * *

UNITED STATES PATENT AND TRADEMARK OFFICE
CERTIFICATE OF CORRECTION

PATENT NO. : 9,723,377 B2
APPLICATION NO. : 14/263459
DATED : August 1, 2017
INVENTOR(S) : Srinath V. Ramaswamy Page 1 of 1

It is certified that error appears in the above-identified patent and that said Letters Patent is hereby corrected as shown below:

In the Drawings

Sheet 1 of 5, Figure 1, Reference Numeral 113, Line 1:
Please delete "Set Top Box/DVR" and insert --Set-Top Box/DVR--.

In the Specification

Column 1, Summary, Line 66:
Delete "v th" and insert --vth--.

Column 2, Summary, Line 2:
Delete "v th" and insert --vth--.

Column 2, Summary, Line 5:
Delete "u th" and insert --uth--.

Column 6, Detailed Description, Line 45:
Delete "VP/B-fram" and insert --I/P/B-frame--.

Signed and Sealed this
Twenty-first Day of August, 2018

Andrei Iancu
*Director of the United States Patent and Trademark Office*